United States Patent [19]

Pulda

[11] 4,068,765
[45] Jan. 17, 1978

[54] STACKING OF MATERIALS
[75] Inventor: William F. Pulda, Piscataway, N.J.
[73] Assignee: Vanguard Machinery Corporation, Edison, N.J.
[21] Appl. No.: 681,683
[22] Filed: Apr. 29, 1976
[51] Int. Cl.² ............................................. B65G 57/22
[52] U.S. Cl. .................................. 214/6 G; 214/6 P; 214/152; 271/189; 271/245
[58] Field of Search ................... 214/6 G, 6 DK, 6 P, 214/6 S, 152; 271/67, 73, 189, 191, 245; 198/374, 491

[56] References Cited
U.S. PATENT DOCUMENTS

| 2,699,264 | 1/1955 | Bruce et al. | 214/6 P X |
| 3,017,041 | 1/1962 | Hawkes et al. | 214/6 G X |
| 3,696,945 | 10/1972 | Bobolts | 214/6 G |
| 3,833,132 | 9/1974 | Alduk | 214/6 G |
| 3,901,391 | 8/1975 | Carlson et al. | 214/6 G |

FOREIGN PATENT DOCUMENTS 1,390,764  4/1975  United Kingdom ............. 214/6 DK Primary Examiner—L. J. Paperner
Attorney, Agent, or Firm—George E. Kersey

[57] ABSTRACT

A stacking assemblage fed from a conveyor which transports materials to a staging area. The materials are formed into a tier on a movable platen of the assemblage in accordance with a prescribed pattern. The platen can be raised or lowered to a desired level and then shifted to deposit each tier on an outboard conveyor until a desired multi-tier stack is formed.

9 Claims, 4 Drawing Figures

STACKING OF MATERIALS

BACKGROUND OF THE INVENTION

This invention relates to the stacking of materials, and, more particularly, to the stacking of relatively large volumes of material.

There are many situations where it is desirable to deal with large volumes of material. One example is in the operation of high speed processing machinery. Unless the materials to be processed are available in sufficient quantities, the machinery will not be able to operate at full capacity.

Another example is the movement of materials over long distances. It is apparent that the subsequent handling of the materials will be expedited if they are pre-stacked.

It is common practice to form stacks of materials on support structures such as pallets. The entire stack can then be moved by lifting the pallet.

Of course, if the materials are not arranged properly, the stack will not be able to provide the maximum quantity per unit volume. In addition, the stack may be unstable, particularly if it is large.

In order to provide stability and stack efficiency, it is common practice to form the stacks in tiers or layers, with each tier having a particular pattern. The patterns can then be alternated or varied in successive tiers in order to strengthen the average stack.

It is apparent that such a stack can be formed manually, but that is labor intensive. It is fatiguing to the stackers and relatively slow.

Numerous attempts have been made to reduce the fatigue factor and the number of persons needed for stacking. In various semi-automatic systems now in use, takes place by an operator at the top of an inclined conveyor to which the items to be stacked are fed.

In one such arrangement, the stacker machine makes use of an open top elevator. Initially the elevator platform is fully elevated. An operator receives items to be stacked at the top of an inclined feed conveyor and places them at the top opening in a desired pattern on the elevated platform to form a base tier. The elevator platform is then lowered by one tier level and a new tier is formed on the prior tier. This procedure is repeated until the entire stack is formed and the platform is in its base position. The completed stack is then removed from the machine and sent on its way.

While an improvement over purely manual stacking, the elevator stacker has a number of disadvantages. The movable platform has to support the full weight of the overall stack and therefore must be mechanically rugged and complex. More importantly, the operator is positioned at the top of the elevator. Not only is there limited space for movement, the operator must remain in position throughout the stacking operation. Consequently he is not available for ground level activities that are inevitably required. Finally, the items to be stacked must be transported to the top of the elevator by a relatively large inclined conveyor. The result is that a lot of space is need for the stacking operation.

In a variant of the elevator stacker, the platform is made to carry each tier to the appropriate stack level and return to the top of the elevator to receive a subsequent tier. While this arrangement allows the platform to operate with a reduced load, the principal disadvantages of the ordinary elevator stacker remain, namely the need for an operator at the top of the elevator, so that he is unavailable for ground level duties, and the need for a relatively long, inclined conveyor to carry the materials to the stacking position, so that a significant amount of equipment space is required.

Accordingly, it is an object of the invention to expedite the stacking of materials. A related object is to expedite the stacking of large volumes of material.

Another object of the invention is to enhance the effectiveness of stacking with mechanical equipment. A related objective is to enhance the effectiveness of stacking with semi-automatic equipment.

A further object of the invention is to achieve automated stacking using a limited amount of equipment space. A related object is to eliminate the need for relatively long, inclined power conveyors in semi-automatic stacking.

Yet another object of the invention is to enhance operator effectiveness in semi-automatic stacking. A related object is to make the operator in semi-automatic stacking available for other ground level duties, as well as the control of stacking. Another related object is to eliminate the need for stationing an operator at relatively high levels (as much as eight feet) above ground level in semi-automatic stacking.

SUMMARY OF THE INVENTION

In accomplishing the foregoing and related objects, the invention makes use of a translatable and laterally displaceable platen. Materials at a receiving position are arranged on the platen in a single tier or layer at a time in a prescribed pattern. The platen is then moved to overlie a loading position and the tier deposited. Subsequent tiers are formed and deposited in the same way to produce a multi-tier stack at the loading position.

In accordance with one aspect of the invention, each tier can be formed on the platen by or under the control of a ground level operator. As a result the operator is free to pursue other ground level duties. In addition there is no need to use a relatively long, inclined conveyor to carry materials to the receiving position. The result is a considerable saving in the space that would otherwise be used by the inclined conveyor.

In accordance with another aspect of the invention, the receiving position and the loading position are at the same operational level. This permits a ground level operator to attend to both loading and stacking operation.

In accordance with a further aspect of the invention, the platen is elevatable. This permits the stack to be formed by building successive tiers on prior tiers at the loading position.

In accordance with a still further aspect of the invention, the platen can be lowered from its initial position. This permits an extension in the range of the stacking equipment.

In accordance with yet another aspect of the invention a guide member, which can take the form of a stripper, can be employed to facilitate the deposit of each tier in the proper position at the loading position.

DESCRIPTION OF THE DRAWINGS

Other aspects of the invention will become apparent after considering several illustrative embodiments, taken in conjunction with the drawings in which.

DETAILED DESCRIPTION

Figure 1:
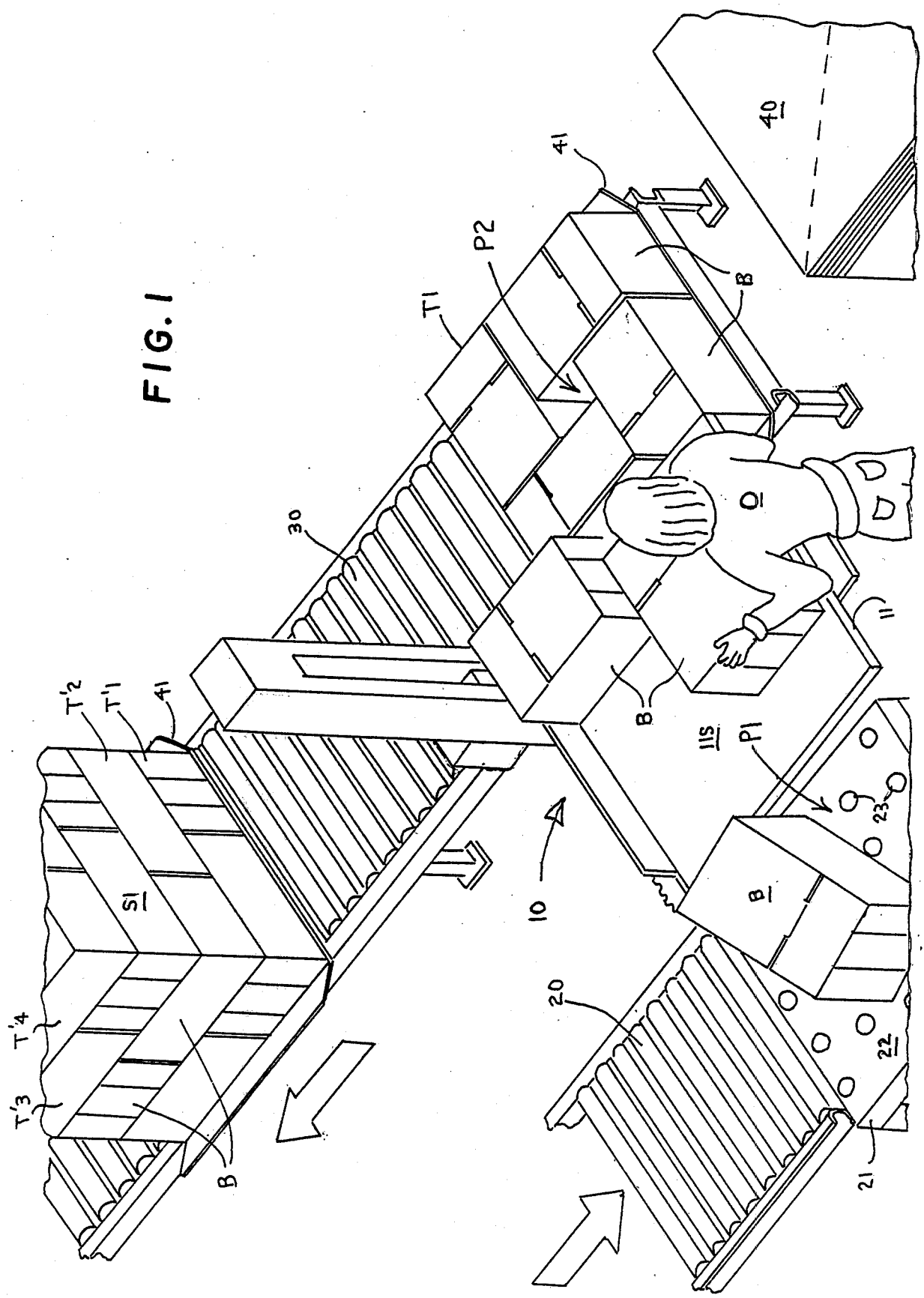
FIG. 1 is a partial perspective view of a system being used to form stacks in accordance with the invention.

Turning to the drawings, a stacking assemblage 10 in accordance with the invention is positioned between a receiving or staging position P1 and an outbound or loading position P2.

Items to be stacked, such as individual bundles B, reach the receiving position P1 over an infeed conveyor 20, which terminates in staging platform 21. To facilitate the movement of the bundles B on the platform 21, its surface 22 has a set of raised spheroids 23. In some cases, it is advantageous to further facilitate the movement of bundles across the surface 22 by substituting ball bearings for the spheroids 23.

Once a bundle arrives at the staging area, it is moved by an operator O to a platen 11 of the stacking assemblage 10, where it forms a part of a prescribed pattern of bundles in a single tier or layer. The surface 11s of the platen 11 may be may be similar to the surface 22 of the staging platform 21 to facilitate movement of the bundles, or it may be formed by rotatable cylinders of the kind commonly employed in conveyors.

After each tier is completed by the operator O on the platen 11, the stacking assemblage 10 is operated to deposit the tier at the loading position P2 on an outbound conveyor 30.

As can be seen from FIG. 1, a prior tier T1 is already located at the loading position P2; and a prior stack S1 that has been formed by the stacking assemblage 10 is farther down the outbound conveyor 30. The stack S1 is made up of various tiers, of which tiers T'1 and T'2, and parts of tiers T'3 and T'4 are visible. The stack S1 and the tier T1 are formed on a support sheet 41 which is taken from a stack 40. In some cases pallets are substituted for the support sheets 41. In other cases, no support sheet is needed.

It will be noted that the tiers T'1 through T'4 of the stack S1 have alternative configurations in order to increase the the stability of the overall stack. Each bundle B is illustratively rectangular, being formed by a substack of collapsed boxes which are to be imprinted and filled with merchandise. In the stack S1, the bundles are lapped for increased stability by having each short side adjoining a long side in an adjoining tier.

In addition, an automatic device may be substituted for the staging platform 21 in order to arrange the incoming bundles in a prescribed pattern on the platen 11.

Figure 2:
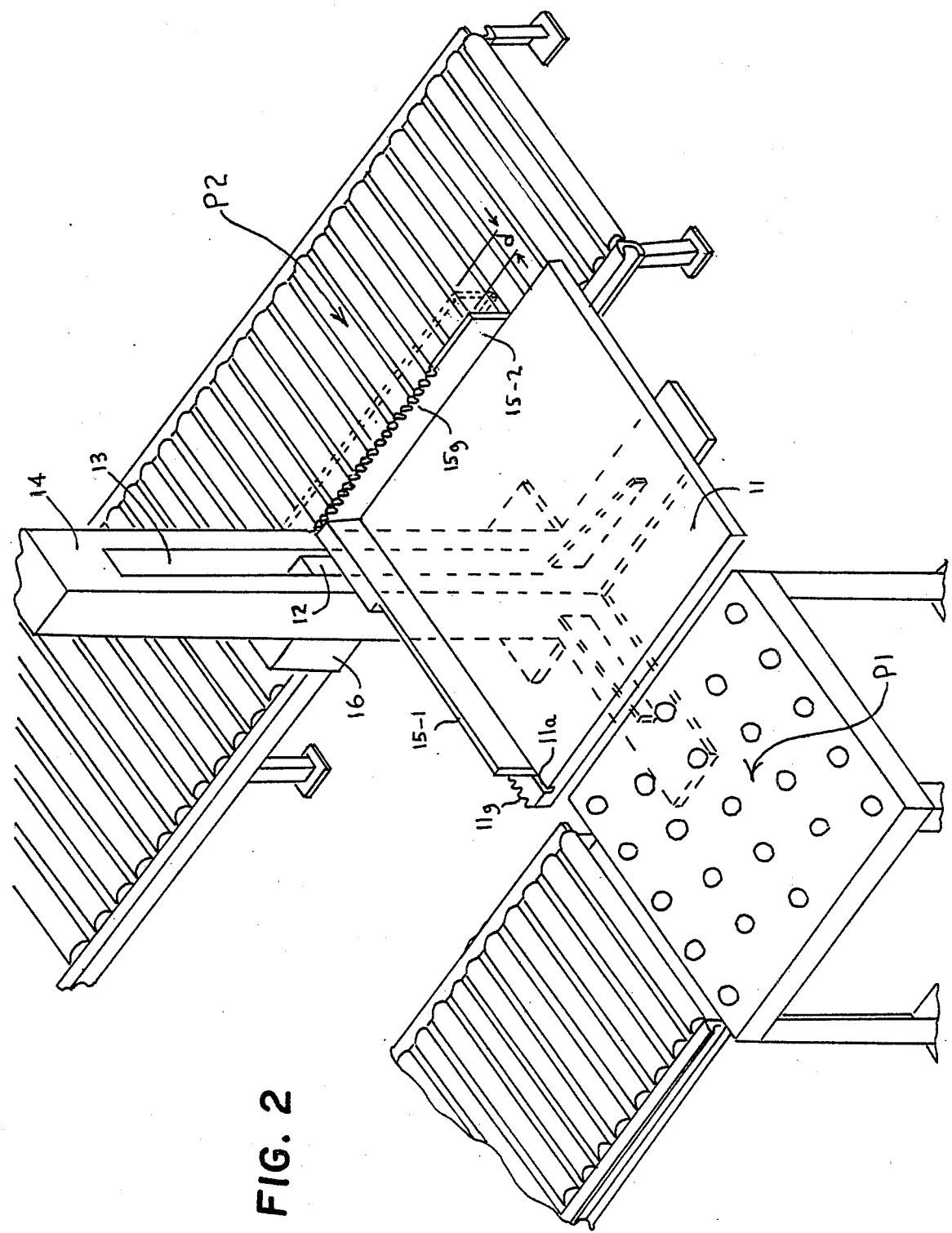
FIG. 2 is a partial perspective view showing details of the system of FIG. 1.

Details of the stacking assemblage 10 are shown in FIG. 2. The platen 11 is vertically and horizontally movable by being mounted with respect to a platen support 12 in a channel 13 of stacker support 14. Gear head motors (not shown) of conventional design may be used with drive cables to move the support 12, and in turn the platen 11, upwardly or downwardly on command.

Horizontal movement of the platen 11 is provided by appropriate gearing (not shown) in the support 12 which acts on gear teeth 11g to move the platen until it overlies the loading position P2.

To further facilitate the operation of the stacking assemblage 10, guide members 15-1 and 15-2 are included. The first guide member 15-1 is attached to the platen support 12, so that movement of the platen 11 is relative to it, in a guide groove 11a.

The second guide member 15-2 is retractable with respect to a mount 16 that moves with the platen support 12. The mount 16 not only includes gearing (not shown) that meshes with the guide teeth 15g; in addition, the mount 16 desirably includes a yoke and plunger arrangement, for example (not shown) to displace the second guide 15-2 in the direction of the lateral movement of the platen 11 by a prescribed amount d.

Figure 3:
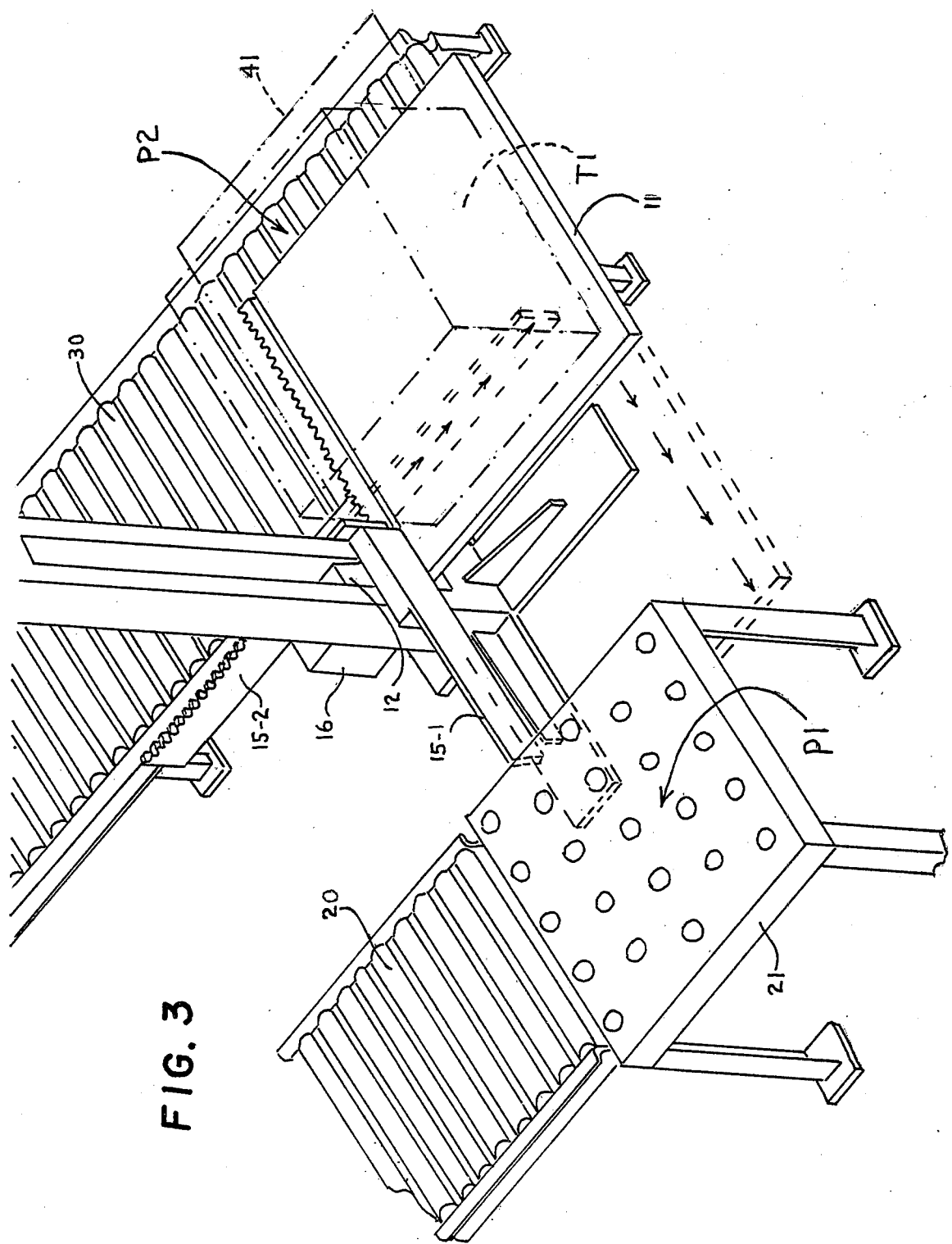
FIG. 3 is a partial perspective view showing a platen of a stacking assemblage in accordance with the invention being moved to overlie a loading position.

An illustrative displacement of the platen 11 is pictured in FIG. 3. As shown, the platen 11 had previously been lowered below the level of the staging platform 21 after the formulation of the tier T1 shown in phantom by downward movement of the platen support 12. This is because the outbound conveyor 30 is located below the level of the inbound conveyor 20. Since multi-tier stacks are to be formed on the outbound conveyor 30, it is advantageous for the conveyor to be below the level at which operator force will be applied to move the resultant stacks along the conveyor. In addition, even if the outbound conveyor 30 is at the level of the inbound conveyor 20, it is advantageous for the platen 11 to go below that level in order to extend the stacking capability.

Thus, if the platen can be lowered by one or more tier levels, an operator can form two or more tiers on the platen while working at customary ground level. The multiple tier is then deposited at the loading position in the usual way.

Before the platen in FIG. 3 begins its movement towards the loading position, the second guide 15-2, which acts as a stripper, is retracted. This is to prevent interference with the tier T1. Once the platen is fully displaced, the stripper is returned to its original position. When the platen 11 is moved towards the staging member 21, the tier T1 engages the outward side of the stripper and is prevented from further movement, so that it drops at the loading position on the support sheet 41.

As noted earlier, the stripper 15-2 is desirably displaceable in the direction of outward movement of the platen 11. This displacement prevents the tiers of the stack formed at the loading position from interfering with the stacking assemblage 10 by providing for example, a clearance on the order of several inches depending on the extent of the lateral displacement of the stripper.

Figure 4:
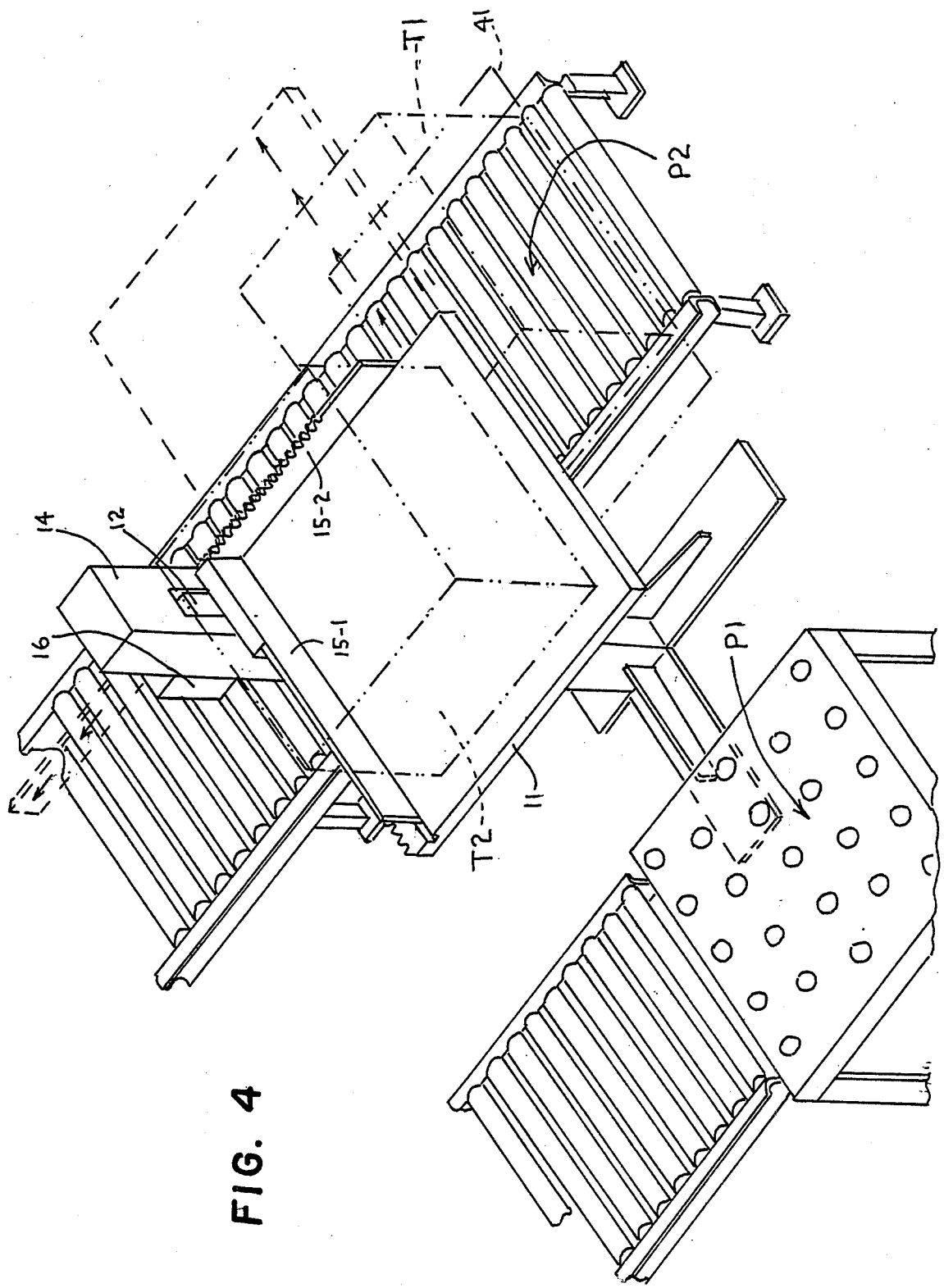
FIG. 4 is a partial perspective view showing the platen of FIG. 3 in an elevated position prior to being moved to overlie the loading position.

In FIG. 4, the platen 11 is shown in an elevated position preparatory to the deposit of a second tier T2 on the prior tier T1 at the loading position P2. The operation of the stacking assemblage is otherwise the same as that illustrated in FIG. 3.

While various aspects of the invention have been set forth by the drawings and the specification, it is to be understood that the foregoing detailed description is for illustration only and that various changes in parts, as well as the substitution of equivalent constituents for those shown and described may be made without departing from the spirit and scope of the invention as set forth in the appended claims.

What is claimed is:

1. A stacking assemblage comprising
    a movable platen for supporting materials received at a first position;
    a guide member transversely movable with respect to said platen against which said materials are arranged in a tier in accordance with a prescribed pattern;

means for transversely moving said guide member away from said tier;

means for shifting said platen through the position previously occupied by said guide member to overlie a second position;

said guide member being displacable in the direction of motion of said platen when said platen is shifted to overlie said second position; and the shifting means depositing said tier at said second position as a constituent of a multi-tier stack by drawing said tier against said guide member.

2. A stacking assemblage as defined in claim 1 wherein said first position and said second position are at the same operational level.

3. A stacking assemblage as defined in claim 1 wherein said second position is laterally displaced from and below said first position; and said platen can be elevated above and below said first position.

4. A stacking assemblage as defined in claim 1 wherein said second position is laterally displaced from said first position and the shifting means comprises means for laterally moving said platen to and above said second position.

5. A stacking assemblage as defined in claim 1 wherein said platen temporarily supports said tier in a prescribed pattern thereon.

6. A stacking assemblage as defined in claim 1 including a further guide member associated with said platen.

7. A method of stacking materials comprising the steps of a. forming a tier of materials in a prescribed pattern from materials received at a first position upon a movable platen and against a guide member;

b. retracting said guide member transversely with respect to said platen and shifting said platen with said tier thereon to overlie a second position; and c. moving said guide member in the direction of movement of said platen and depositing said tier at said second position.

8. The method of claim 7 wherein said guide member is repositioned transversely after said platen has been shifted, and said tier is deposited by withdrawing said platen with said tier in contact with said guide member.

9. The method of claim 7 wherein said guide member is movable transversely to said platen simultaneously with its movement in the direction of movement of said platen.

* * * * *